United States Patent
Della Fiora et al.

[19]

[11] Patent Number: 6,125,031
[45] Date of Patent: Sep. 26, 2000

[54] PLASTIC COMPUTER HOUSING/ACCESS DOOR APPARATUS WITH INTEGRALLY MOLDED DUAL FUNCTION HINGE ASSEMBLY

[75] Inventors: Troy A. Della Fiora, Spring; Daniel J. Riccio, Jr., The Woodlands; Ian Kung, Houston, all of Tex.

[73] Assignee: Compaq Computer Corporation, Houston, Tex.

[21] Appl. No.: 09/083,836

[22] Filed: May 22, 1998

[51] Int. Cl.[7] .................................. G06F 1/16; H05K 5/02
[52] U.S. Cl. ............................................. 361/683; 220/341
[58] Field of Search ...................... 361/683; 312/223.2, 312/327, 328, 265.5, 265.6; 220/334, 337, 341, 342

[56] References Cited

U.S. PATENT DOCUMENTS

| | | | |
|---|---|---|---|
| 5,076,461 | 12/1991 | Nichols | 220/352 |
| 5,116,261 | 5/1992 | Lan et al. | 312/292 |
| 5,165,790 | 2/1993 | Mischneko | 379/433 |
| 5,199,888 | 4/1993 | Condra et al. | 439/142 |
| 5,513,068 | 4/1996 | Girard | 361/685 |
| 5,542,757 | 8/1996 | Chang | 312/223.2 |
| 5,557,499 | 9/1996 | Reiter et al. | 361/685 |
| 5,574,625 | 11/1996 | Ohgami et al. | 361/684 |
| 5,586,003 | 12/1996 | Schmitt et al. | 361/683 |
| 5,593,220 | 1/1997 | Seid et al. | 312/265.6 |
| 5,724,226 | 3/1998 | Ruch et al. | 361/683 |
| 5,745,342 | 4/1998 | Jeffries et al. | 361/683 |
| 5,755,497 | 5/1998 | Chang | 312/223.2 |
| 5,768,097 | 6/1998 | Jelinger | 361/683 |
| 5,815,379 | 9/1998 | Mundt | 361/683 |

*Primary Examiner*—Lynn D. Feild

[57] ABSTRACT

A tower computer housing has a molded plastic exterior wall portion with an access opening therein, a molded plastic access door, and a specially designed hinge structure that supports the access door on the housing for pivotal movement relative thereto between closed and open positions in which the door respectively covers and uncovers the access opening. The hinge structure includes spaced pairs of hinge pins and cam arms molded integrally on opposite ends of the access door, and spaced apart first and second resilient mounting and spring tab sets molded integrally with the housing exterior wall portion. Each of these sets includes a resilient mounting tab having a mounting hole therein and positioned between an opposed pair of resilient spring tabs. The door pins are removably snap-fitted into the mounting tab holes, and each of the door cam arms is positioned between and slidingly engages a pair of the spring tabs. When the door is manually pivoted through an initial arc toward a selected one of its closed and open positions, the spring tabs are deflected and function to automatically drive the door through a final arc to its selected position.

42 Claims, 4 Drawing Sheets

FIG.4
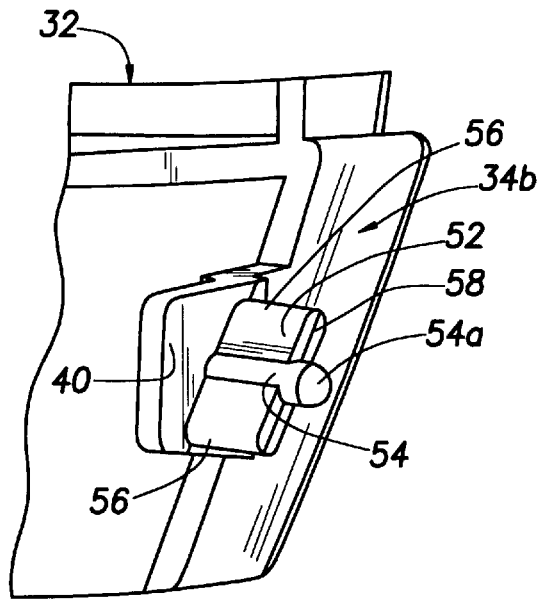
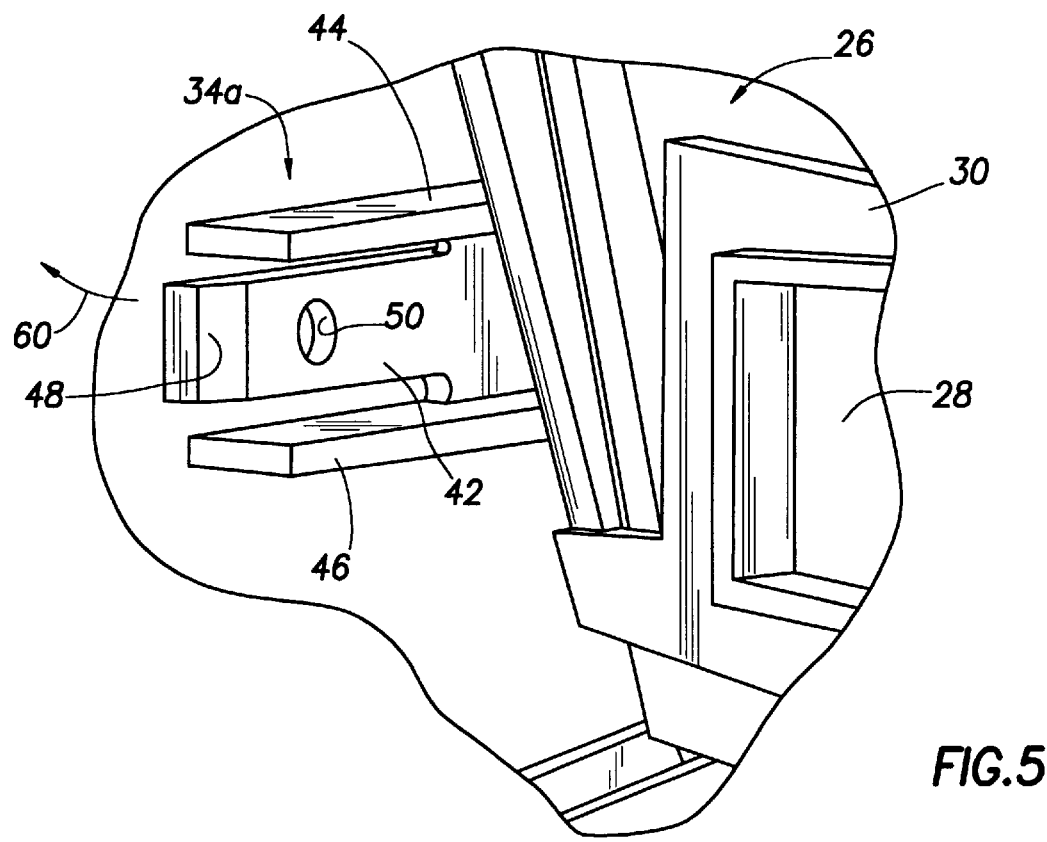
FIG.5

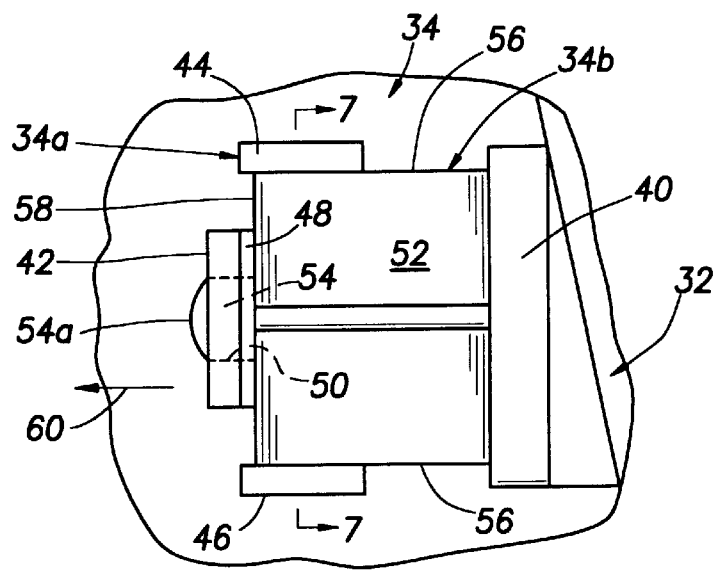
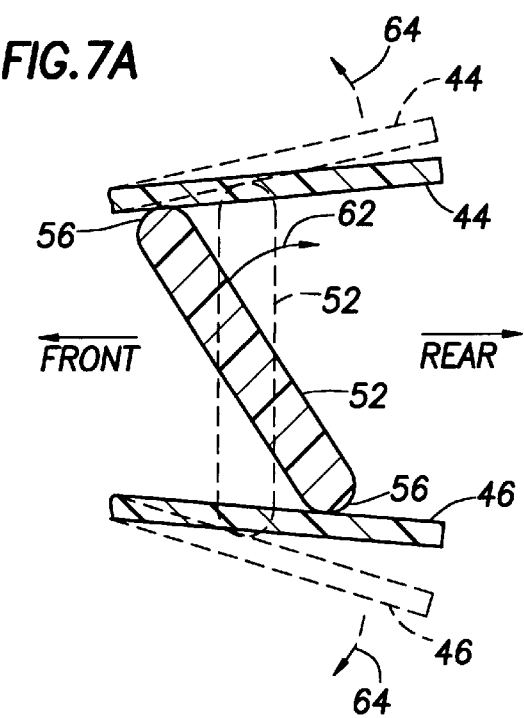

PLASTIC COMPUTER HOUSING/ACCESS DOOR APPARATUS WITH INTEGRALLY MOLDED DUAL FUNCTION HINGE ASSEMBLY

BACKGROUND OF THE INVENTION

1. Field of the Invention

The present invention generally relates to electronic apparatus and, in a preferred embodiment thereof, more particularly relates to mounting apparatus for computer housing access doors.

2. Description of Related Art

A particularly useful and convenient construction for a pivotally mounted access door on an electronic apparatus, such as a computer, is typically referred to as a "single action" mounting structure. When an access door is mounted to provide this type of action, it may be simply pushed to open it an initial amount, at which point a built-in spring action opens it the rest of the way to a fully open position, and then later pushed part of the way toward its closed position, at which point the built-in spring action automatically takes over to automatically return the door the rest of the way to its closed position.

While this single action mounting action is relatively easy to describe, as conventionally constructed it can be surprisingly complex, thereby undesirably increasing its fabrication and installation/removal costs. For example, one previously utilized access door provided with a conventional "single action" pivotal mounting structure had a parts list that included metal mounting brackets, attachment screws, a metal load spring, a metal hinge pin, a plastic door tray, a spring load governing gear train, and a metal spring retainer structure.

In view of this well known, relatively high cost and complexity associated with single action access door mounting structures, it can be readily seen that a need exists for a simpler, less complicated single action access door mounting structure. It is to this need that the present invention is directed.

SUMMARY OF THE INVENTION

In carrying out principles of the present invention, in accordance with a preferred embodiment thereof, an electronic apparatus is provided which is representatively a tower type CPU unit of a computer system and includes a housing having a wall opening therein and an access door supported on the housing for pivotal movement relative thereto between closed and open positions in which the door respectively covers and uncovers the wall opening.

According to a key aspect of the invention, the access door is supported in this manner on the housing by a specially designed dual function hinge structure that is of a uniquely simple and inexpensive construction. Preferably, both the housing wall portion in which the opening is formed and the access door are plastic moldings, and the hinge structure is entirely defined by first and second interengageable portions which are respectively molded integrally with the housing wall portion and the access door. In addition to pivotally supporting the access door on the housing, the hinge structure also automatically functions, in response to a manual movement of the access door through an initial distance toward a selected one of its closed and open positions, to forcibly move the access door through a final distance to, and then releasably retain the access door in, the selected position.

In a preferred configuration of the dual function hinge structure, the first hinge portion includes a spaced pair of resiliently deflectable mounting plates, having circular holes therein, and first and second pairs of opposing, resiliently deflectable spring plates positioned adjacent the mounting plates in perpendicular relationships therewith. The second hinge portion includes a pair of cam arms positioned at opposite ends of the access door, and a pair of hinge pins projecting outwardly from the cam arms.

The access door may be quickly and easily mounted on the housing by simply pushing the hinge pins against the mounting plates in a manner deflecting them in opposite directions and causing the hinge pins to snap into place rotatably within the mounting plate holes. With the access door removably snapped into place in this manner, each of the cam arms is positioned between one of the opposing pairs of spring plates in a manner such that opposite outer edges of the cam arm slidingly engage the opposing spring plates.

When the access door is manually pivoted an initial distance away from either of its closed and open positions towards its other position, the cam arms initially deflect the spring plates in each opposed pair thereof away from one another until the cam arms are rotated to over-center positions relative to the resiliently deflected spring plates. At this point the deflected spring plates automatically drive the access door a final distance to its new position while snapping back to their original undeflected orientations to releasably retain the pivoted access door in its new position.

BRIEF DESCRIPTION OF THE DRAWINGS

FIG. 4 is an enlarged scale perspective detail view of the dashed circle area "4" of the access door shown in FIG. 2B;

FIG. 5 is an enlarged scale perspective detail view of the bezel hinge structure portion within the dashed circle area "5" in FIG. 2B;

FIG. 6 is an enlarged scale simplified rear side elevational view of a portion of the assembled hinge structure taken generally along line 6—6 of FIG. 2A; and FIGS. 7A and 7B are cross-sectional views through a portion of the assembled hinge structure, taken along line 7—7 of FIG. 6, and sequentially illustrate the operation of the hinge structure as the mounted access door is pivoted from its closed position to its open position.

DETAILED DESCRIPTION

Figure 1:
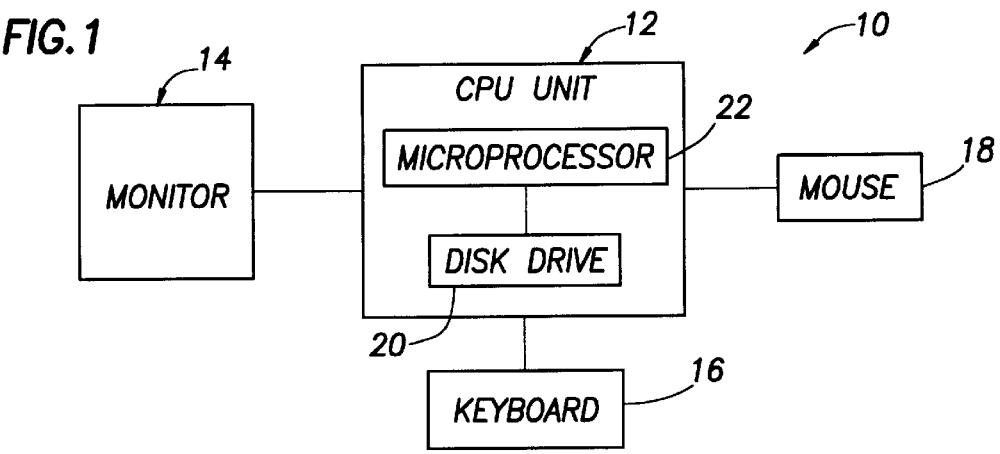
FIG. 1 is a schematic diagram of a computer system having incorporated therein a tower type CPU unit with a specially designed integrally formed access door hinge structure embodying principles of the present invention.

Schematically illustrated in FIG. 1 is a representative computer system 10, the components of which are interconnected as shown and include a computer, illustratively in the form of a tower type CPU unit 12; a monitor 14; a keyboard 16; and a pointing device, representatively in the form of a mouse 18. In addition to various other components disposed therein, the CPU unit 12 has a data storage device, representatively a disk drive 20, for storing data that may be retrieved by a microprocessor 22 within the CPU unit 12.

Figure 2:
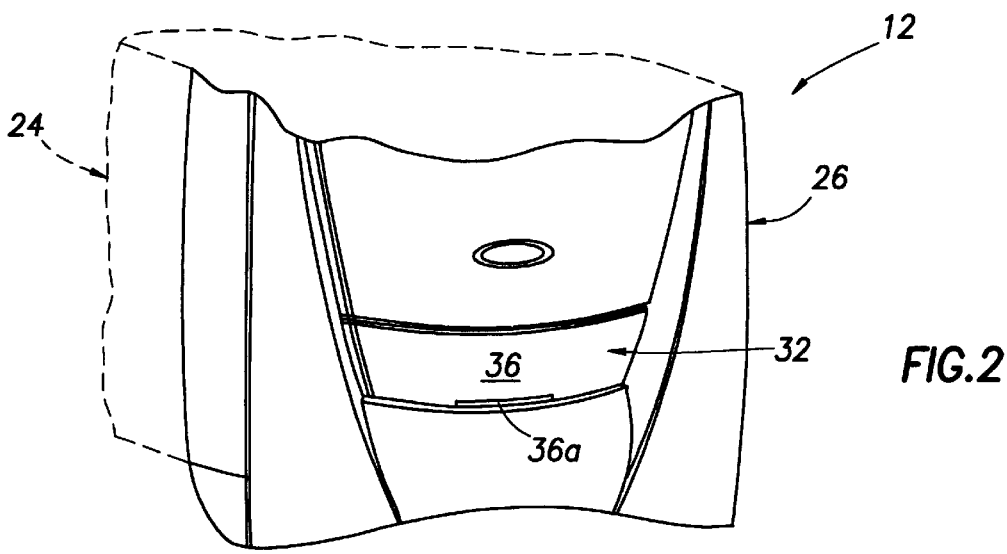
FIG. 2 is a partially phantomed perspective view of a bottom front side portion of the CPU unit with its illustrated access door in its closed orientation.
Figure 3:
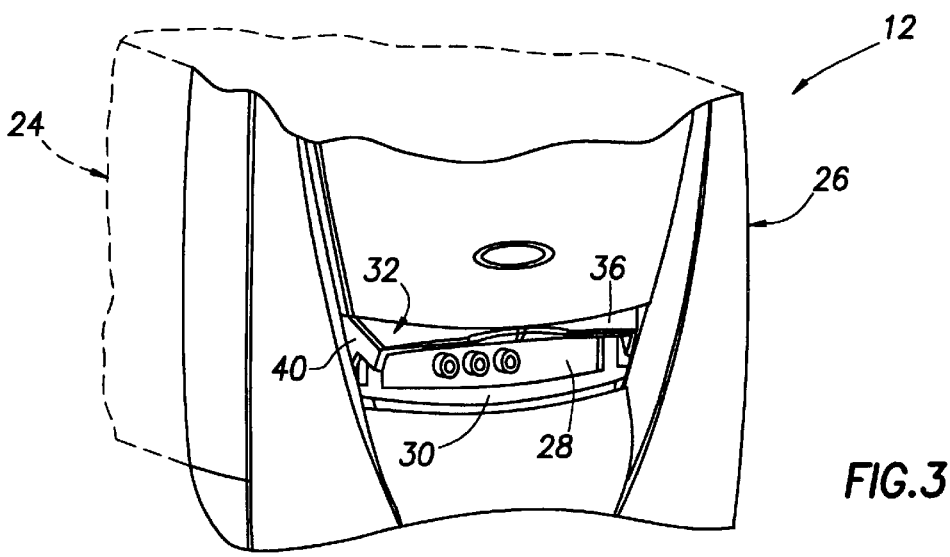
FIG. 3 is a partially phantomed perspective view similar to that in FIG. 2, but with the access door pivoted upwardly to its open orientation.
Figure 2A:
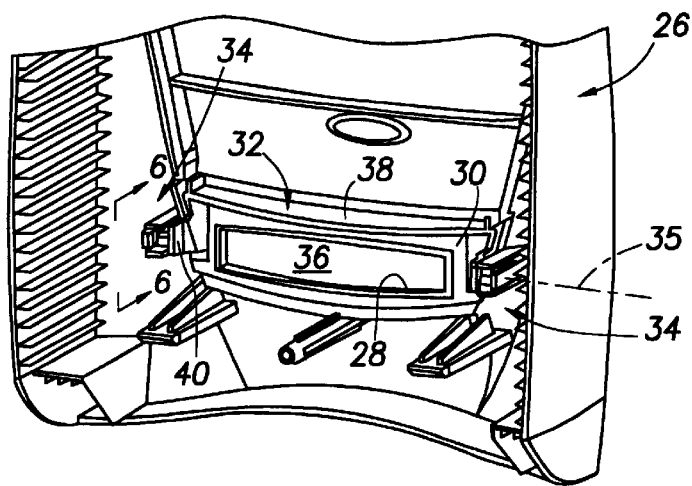
FIG. 2A is a rear side perspective view of the front housing bezel portion shown in FIG. 2, with the access door closed.
Figure 3A:
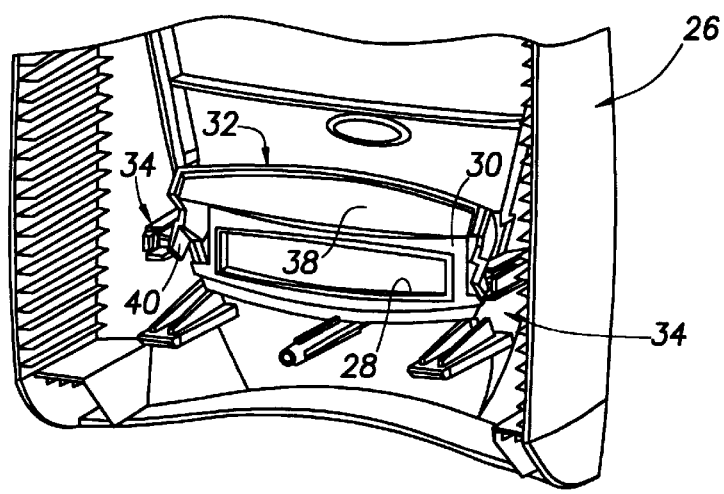
FIG. 3A is a rear side perspective view of the bezel portion similar to that in FIG. 2A, but with the access door opened.

As illustrated in FIGS. 2 and 3, the CPU unit 12 has a generally rectangular housing portion 24 with a vertical front side portion being defined by a molded plastic bezel structure 26. Formed in a lower portion of the bezel 26 is a generally rectangular opening, representatively a front I/O port opening 28 disposed within a molded plastic frame structure 30. TO selectively cover and uncover the opening 28, a horizontally elongated molded plastic access door 32 is provided. Access door 32 is removably secured to the bezel 26 by specially designed molded plastic hinge structures 34 (see FIGS. 2A and 3A) disposed at the opposite ends of the mounted access door 32 and embodying principles of the present invention.

Hinge structures 34 are positioned on the rear or inner side of the front bezel structure 26 and function to removably mount the access door 32 on the front bezel structure 26 for pivotal motion relative thereto, representatively about a horizontal axis 35 (see FIG. 2A), between a closed position in which the access door 32 is downwardly pivoted and covers the housing wall structure opening 28 (see FIGS. 2 and 2A), and an open position (see FIGS. 3 and 3A) in which the access door 32 is upwardly pivoted and uncovers the opening 28.

Figure 2B:
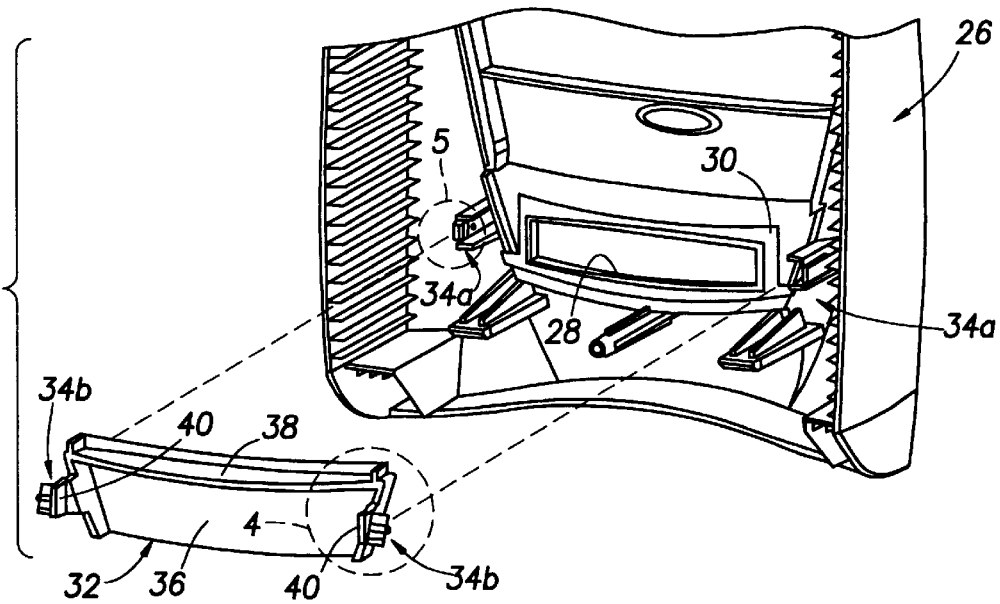
FIG. 2B is a view similar to that in FIG. 2A, but with the access door removed from the bezel portion.

Although the access door 32 could be provided with a variety of shapes, it is representatively of a horizontally elongated configuration, having a front panel portion 36, a transverse top panel portion 38 extending rearwardly from the top side of the front panel 36, and a pair of end tab portions 40 projecting rearwardly from opposite ends of the front panel portion 36 (see FIGS. 2B, 4 and 6).

Each of the specially designed hinge structures 34 of the present invention is positioned at opposite ends of the housing wall opening 28 and includes two simple and inexpensive releasably interengageable molded plastic portions—a first portion 34a molded onto the rear side of the bezel structure 26 adjacent the opposite ends of the wall opening 28 (see FIGS. 2B and 5), and a second portion 34b molded onto the opposite end tabs 40 of the access door 32 (see FIGS. 2B and 4).

Turning now to FIGS. 5 and 6, each of the hinge portions 34a formed integrally with the bezel structure 26 projects inwardly beyond the front side of the bezel structure 26 and includes a horizontally elongated resilient mounting plate 42 positioned between horizontally elongated resilient top and bottom spring plates 44 and 46. Mounting plate 42 has a rear or outer end portion having a ramped deflection surface 48 and a circular hinge pin opening 50.

As best illustrated in FIGS. 4 and 6, each of the hinge portions 34b formed integrally with the access door 32 includes a generally rectangular cam arm 52 projecting outwardly from the outer side of one of the access door end tabs 40, and a hinge pin 54. Each of the cam arms 52 has opposite rounded outer side edges 56, and a flat outer end surface 58. Each hinge pin 54 longitudinally projects outwardly beyond one of the outer cam arm end surfaces 58 and has a domed outer end 54a.

The access door 32 may be easily, quickly and removably installed on the bezel structure 26 simply by snapping the integral door hinge structure (i.e., the hinge portions 34b) onto the integral bezel hinge structure (i.e., the hinge portions 34a). This is accomplished by placing the domed outer hinge pin ends 54a against the ramped outer end portions 48 of the opposing resilient mounting plates 42 and then pushing the access door 32 generally forwardly. This causes the domed pin ends 54a to slide along the ramped mounting plate surfaces 48, and cam the mounting plates 42 outwardly as indicated by the arrows 60 in FIGS. 5 and 6, to permit the hinge pins 54 to snap into the mounting plate pin openings 50 as shown for one of the pins 54 in FIG. 6.

This snap-on installation of the access door 32 places its cam arms 52 between the opposing pairs of resilient top and bottom spring plates 44,46 with the rounded outer side edges 56 of each cam arm 52 slidingly engaging the opposing side surfaces of its associated top and bottom spring plates 44,46 as shown in FIG. 7A in which one of the cam arms 52, in its indicated solid line position, is schematically shown in the position that it assumes when the access door 32 is in its closed position. With the access door 32 in its closed position, the cam arms 52 are downwardly and rearwardly canted, with their rounded opposite side edges 56 slidingly engaging the vertically facing side surfaces of the opposing top and bottom spring plates 44,46.

As can be seen in FIG. 7A, when the access door 32 is in its closed position, the opposing pairs of spring plates 44,46 resiliently retain the door in such closed position against pivotal movement toward its open position. Representatively, with the door in its closed position, a portion of the door abuts a suitable facing portion of the bezel (not shown) to prevent the door from pivoting forwardly and downwardly past its closed position. If the door is rotated rearwardly and upwardly toward its open position, as indicated by the arrow 62 in FIG. 7A, the plates 44,46 resiliently resist such pivotal movement of the door as the plates 44,46 are deflected outwardly toward their dotted line positions, as indicated by the arrows 64, by the sliding engagement of the plates 44,46 by the rounded outer side edges 56 of the cam arms 52.

The access door 32 may, however, be forcibly pivoted from its closed position to its open position by manually pushing upwardly on the bottom side edge 36a of the front door panel 36 (see FIG. 2). This causes the cam arms 52 to be pivoted to and somewhat past their dotted line FIG. 7A upright orientations at which point the opposing spring plate pairs 44,46 have been moved to their fully deflected dotted line positions shown in FIG. 7 and then snap back to their FIG. 7B solid line positions as indicated by the arrows 66 in FIG. 7B. This, in turn, pivots the cam arms 52 through a final distance to their solid line FIG. 7B position, as indicated by the arrow 68, to open the door and resiliently retain it in its open position. A suitable abutment (not shown) between the opened door and the bezel prevents the door from being pivoted rearwardly past its open position. With the door resiliently held in its open position by the interengagement between the cam arms 52 and the opposing spring plate pairs 44 and 46, the cam arms 52 are in upwardly and rearwardly canted orientations as shown in FIG. 7B. When the access door 32 is subsequently closed, the spring plate pairs 44,46 are resiliently deflected outwardly and yieldingly resist an initial counterclockwise rotation of the cam arms 52 (as viewed in FIG. 7B), and then snap back to their original positions and pivotally drive the door to and then resiliently retain it in its closed orientation.

The overall hinge structure 34 of the present invention, as can be readily be seen from the foregoing, provides a simple and inexpensive apparatus for (1) releasably holding the access door 32 on the bezel 26 for pivotal motion between open and closed positions, and (2) resiliently retaining the door in such open and closed positions. Compared to conventional dual function hinge constructions, the hinge structure 34 eliminates a variety of separate parts and permits the two interengageable portions of the overall hinge structure to be molded integrally with the molded plastic access door and bezel structures.

A variety of modifications could be made to the representatively illustrated bezel, access door and hinge assembly without departing from the principles of the present invention. For example, the access door could be provided with a wide variety of alternate shapes, and could be mounted for rotation about a vertical axis instead of a horizontal axis. Similarly, the access door/hinge structure could be used in a variety of applications other than the illustrated computer housing access door application.

Moreover, while each of the two mounting plates 42 and each of the spring plates in the opposing pairs 44,46 thereof has been illustrated as being of a resilient construction, it will be appreciated that one of the mounting plates 42 could be of a nonresilient construction and still permit the desirable snap-on, snap-off attachment of the access door to the bezel, and that one of the spring plates in each opposing pair 44,46 thereof could be of a nonresilient construction, or eliminated, if desired.

The foregoing detailed description is to be clearly understood as being given by way of illustration and example only, the spirit and scope of the present invention being limited solely by the appended claims.

What is claimed is:

1. Electronic apparatus comprising:
    a housing having a wall opening therein;
    cooperatively interengageable first and second structures respectively carried by said housing and said access door and being operable to:
    (1) pivotally interfit sections of said first and second structures on an axis in a manner mounting said access door on said housing for pivotal movement relative thereto about said axis between a closed position in which said access door covers said wall opening, and an open position in which said access door is swung edgewise through said wall opening into the interior of said housing and uncovers said wall opening, and
    (2) provide between portions of said first and second structures a sliding engagement which, in response to a manual pivoting of said access door through an initial distance toward either selected one of said closed and open positions, resiliently deflects said portion of said first structure and then causes said portion of said first structure to forcibly pivot said access door through a final distance to, and then releasably retain said access door in, the selected position.

2. The electronic apparatus of claim 1 wherein said electronic apparatus is a computer.

3. The electronic apparatus of claim 2 wherein said computer is a tower type CPU unit.

4. The electronic apparatus of claim 1 wherein:
    said housing has an exterior bezel portion, and
    said wall opening is formed in said exterior bezel portion.

5. The electronic apparatus of claim 1 wherein:
    said first and second structures are respectively formed integrally with said housing and said access door.

6. The electronic apparatus of claim 5 wherein:
    said wall opening is formed in a molded plastic wall portion of said housing,
    said first structure is molded integrally with said wall portion,
    said access door is of a molded plastic material, and
    said second structure is molded integrally with said access door.

7. The electronic apparatus of claim 1 wherein:
    said portions of said first and second structures are offset from the pivotally interfitted sections in a direction transverse to said axis.

8. The electronic apparatus of claim 1 wherein said axis extends generally horizontally.

9. The electronic apparatus of claim 1 wherein:
    said first and second structures are operable to removably mount said access door on said housing.

10. The electronic apparatus of claim 9 wherein:
    said first and second structures are operable to provide a removable snap-fit attachment of said access door to said housing.

11. A computer system comprising a CPU unit having a microprocessor and a data storage device for storing data that may be retrieved by said microprocessor, said CPU unit further comprising:
    a housing having a wall opening therein;
    cooperatively interengageable first and second structures respectively carried by said housing and said access door and being operable to:
    (1) pivotally interfit sections of said first and second structures on an axis in a manner mounting said access door on said housing for pivotal movement relative thereto about said axis between a closed position in which said access door covers said wall opening, and an open position in which said access door is swung edgewise through said wall opening into the interior of said housing and uncovers said wall opening, and
    (2) provide between portions of said first and second structures a sliding engagement which, in response to a manual pivoting of said access door through an initial distance toward either selected one of said closed and open positions, resiliently deflects said portion of said first structure and then causes said portion of said first structure to forcibly pivot said access door through a final distance to, and then releasably retain said access door in, the selected position.

12. The computer system of claim 11 wherein said CPU unit is a tower type CPU unit.

13. The computer system of claim 11 wherein:
    said housing has an exterior bezel portion, and
    said wall opening is formed in said exterior bezel portion.

14. The computer system of claim 11 wherein:
    said first and second structures are respectively formed integrally with said housing and said access door.

15. The computer system of claim 14 wherein:
    said wall opening is formed in a molded plastic wall portion of said housing,
    said first structure is molded integrally with said wall portion,
    said access door is of a molded plastic material, and
    said second structure is molded integrally with said access door.

16. The computer system of claim 11 wherein:
    said portions of said first and second structures are offset from the pivotally interfitted sections in a direction transverse to said axis.

17. The computer system of claim 11 wherein said axis extends generally horizontally.

18. The computer system of claim 11 wherein:

said first and second structures are operable to removably mount said access door on said housing.

19. The computer system of claim 18 wherein:

said first and second structures are operable to provide a removable snap-fit attachment of said access door to said housing.

20. Electronic apparatus comprising:

a housing having a wall opening therein;

an access door;

first and second interengaged portions of said housing and said access door extending along an axis and supporting said access door for pivotal motion relative to said housing about said axis between closed and open positions in which said access door respectively covers and uncovers said wall opening; and third and fourth resiliently interengaged portions of said housing and said access door which, in response to a manual movement of said access door through an initial arc toward a selected one of said closed and open positions, function to forcibly move said access door through a final arc to, and then releasably retain said access door in, the selected position, said third and fourth portions being offset from said first and second portions in a direction transverse to said axis.

21. The electronic apparatus of claim 20 wherein:

said first portion includes a pair of mounting tabs having holes therein, and said second portion includes a pair of mounting pins rotatable received in said mounting tab holes.

22. The electronic apparatus of claim 21 wherein:

one of said mounting tabs is resiliently deflectable by one of said mounting pins in a manner permitting said mounting pins to be releasably snap-fitted into said holes.

23. The electronic apparatus of claim 20 wherein:

said third portion includes a resilient spring tab, and said fourth portion includes a cam projection slidingly engaging said spring tab and operative to resiliently deflect it in response to pivotal movement of said access door relative to said housing.

24. The electronic apparatus of claim 22 wherein:

said third portion includes an opposing pair of resilient spring tabs positioned adjacent one of said mounting tabs, and an opposing pair of resilient spring tabs positioned adjacent the other of said mounting tabs, and said fourth portion includes a spaced pair of cam arm projections each being positioned between a different one of said opposing pairs of resilient spring tabs and having opposite side edge portions slidingly engaging the opposing spring tabs and being positioned to resiliently deflect them in response to rotation of said access door relative to said housing.

25. The electronic apparatus of claim 20 wherein:

a wall portion of said housing is of a molded plastic construction and said first and third portions of said housing are integrally molded with said wall portion, and said access door is of a molded plastic construction and said second and fourth portions of said access door are integrally molded with the balance of said access door.

26. The electronic apparatus of claim 20 wherein said electronic apparatus is a computer.

27. The electronic apparatus of claim 20 wherein:

said access door, when in said open position thereof, is swung edgewise through said wall opening into the interior of said housing.

28. A computer system comprising a CPU unit having a microprocessor and a data storage device for storing data that may be retrieved by said microprocessor, said CPU unit further comprising:

a housing having a wall opening therein;

an access door;

first and second interengaged portions of said housing and said access door extending along an axis and supporting said access door for pivotal motion relative to said housing about said axis between closed and open positions in which said access door respectively covers and uncovers said wall opening; and third and fourth resiliently interengaged portions of said housing and said access door which, in response to a manual movement of said access door through an initial arc toward a selected one of said closed and open positions, function to forcibly move said access door through a final arc to, and then releasably retain said access door in, the selected position, said third and fourth portions being offset from said first and second portions in a direction transverse to said axis.

29. The computer system of claim 28 wherein:

said first portion includes a pair of mounting tabs having holes therein, and said second portion includes a pair of mounting pins rotatably received in said mounting tab holes.

30. The computer system of claim 29 wherein:

one of said mounting tabs is resiliently deflectable by one of said mounting pins in a manner permitting said mounting pins to be releasably snap-fitted into said holes.

31. The computer system of claim 28 wherein:

said third portion includes a resilient spring tab, and said fourth portion includes a cam projection slidingly engaging said spring tab and operative to resiliently deflect it in response to pivotal movement of said access door relative to said housing.

32. The computer system of claim 30 wherein:

said third portion includes an opposing pair of resilient spring tabs positioned adjacent one of said mounting tabs, and an opposing pair of resilient spring tabs positioned adjacent the other of said mounting tabs, and said fourth portion includes a spaced pair of cam arm projections each being positioned between a different one of said opposing pairs of resilient spring tabs and having opposite side edge portions slidingly engaging the opposing spring tabs and being positioned to resiliently deflect them in response to rotation of said access door relative to said housing.

33. The computer system of claim 28 wherein:

a wall portion of said housing is of a molded plastic construction and said first and third portions of said housing are integrally molded with said wall portion, and said access door is of a molded plastic construction and said second third portions of said access door are integrally molded with the balance of said access door.

34. The computer system of claim 28 wherein:

said access door, when in said open position thereof, is swung edgewise through said wall opening into the interior of said housing.

35. Electronic apparatus comprising:

a housing having a wall opening therein;

an access door secured to said housing for pivotal motion relative thereto, about an axis extending through the interior of said housing in an inwardly spaced relationship with said wall opening, between a closed position in which said access door covers said wall opening, and an open position in which said access door is swung edgewise into the interior off said housing and uncovers said wall opening, said access door having mounting projections disposed on opposite portions thereof and extending lengthwise outwardly from said opposite portions away from one another along said axis, and side sections extending laterally outwardly therefrom; and a plurality of resilient members carried by said housing and being engageable by said laterally outwardly extending side sections at locations offset from said mounting projections in a direction transverse to said axis, during manual rotation of said access door through an initial distance toward a selected one of said closed and open positions, in a manner causing said plurality of resilient members to resiliently drive said access door a final distance to said selected position.

36. The electronic apparatus of claim 35 wherein said plurality of resilient members are operative to resiliently and releasably retain said access door in said selected position.

37. The electronic apparatus of claim 35 wherein said plurality of resilient members include first and second spring plate members extending into the interior of said housing from portions of said housing adjacent opposing side portions of said wall opening.

38. The electronic apparatus of claim 37 wherein:

said housing has a plastic wall portion in which said wall opening is disposed, and said first and second spring plate members are integral plastic sections of said plastic wall portion.

39. The electronic apparatus of claim 35 wherein said projections have generally pin-like body portions, and said side sections extend laterally outwardly from diametrically opposite locations on said body portions.

40. The electronic apparatus of claim 39 wherein said access door is of a plastic construction and said projections are formed integrally therewith.

41. The electronic apparatus of claim 35 wherein said electronic apparatus is a computer.

42. The electronic apparatus of claim 41 wherein said computer is a tower type CPU unit.

\* \* \* \* \*